United States Patent [19]

Madaj

[11] Patent Number: 5,229,427
[45] Date of Patent: Jul. 20, 1993

[54] FLEXIBLE, COMBUSTION-MODIFIED, POLYURETHANE FOAMS

[75] Inventor: Edmund J. Madaj, Imperial, Pa.

[73] Assignee: Miles Inc., Pittsburgh, Pa.

[21] Appl. No.: 893,472

[22] Filed: Jun. 2, 1992

[51] Int. Cl.$^5$ .................... C08J 9/08; C08G 18/76
[52] U.S. Cl. .................... 521/107; 521/128; 521/160; 521/174; 521/906
[58] Field of Search .............. 521/107, 128, 160, 174, 521/906

[56] References Cited

U.S. PATENT DOCUMENTS

| | | | |
|---|---|---|---|
| 3,960,788 | 6/1976 | Cuscurida et al. | 521/174 |
| 4,113,014 | 9/1978 | Kubens et al. | 528/67 |
| 4,162,357 | 7/1979 | Kubens et al. | 528/67 |
| 4,256,849 | 3/1981 | Ick et al. | 521/160 |
| 4,258,141 | 3/1981 | Jarre et al. | 521/114 |
| 4,261,852 | 4/1981 | Carroll et al. | 521/160 |
| 4,381,351 | 4/1983 | Szabat | 521/107 |
| 4,546,117 | 10/1985 | Szabat | 521/107 |
| 4,611,083 | 9/1986 | Buethe et al. | 521/159 |
| 4,644,015 | 2/1987 | Scaccia et al. | 521/129 |
| 4,745,133 | 5/1988 | Grinbergs et al. | 521/128 |
| 4,757,093 | 7/1988 | Ricciardi et al. | 521/107 |
| 4,757,094 | 7/1988 | Teumac et al. | 521/118 |
| 4,803,229 | 2/1989 | Narayan et al. | 521/160 |
| 4,822,517 | 4/1989 | Jasenak | 252/182.21 |
| 4,826,884 | 5/1989 | Grace et al. | 521/128 |
| 4,849,459 | 7/1989 | Grace et al. | 521/137 |
| 4,900,760 | 2/1990 | Jasenak | 521/160 |
| 5,086,082 | 2/1992 | Stone | 521/128 |
| 5,132,334 | 7/1992 | Gansen et al. | 521/160 |

FOREIGN PATENT DOCUMENTS 2163762 3/1986 United Kingdom.
2177405 1/1987 United Kingdom.

*Primary Examiner*—Maurice J. Welsh
*Assistant Examiner*—Rabon Sergent
*Attorney, Agent, or Firm*—Joseph C. Gil; N. Denise Brown

[57] ABSTRACT

Polyurethane foams of excellent properties are produced by reacting a) one or more polyether polyols, b) a polymethylene poly(phenyl isocyanate) having a methylene-bis(phenyl isocyanate) content of from 70 to 77% by weight, c) melamine, d) a phosphorous containing compound and d) water as the blowing agent. The isocyanate must have a specific 4,4' to 2,4'-isomer ratio and the amounts of melamine and phosphorous must be within narrowly defined limits.

4 Claims, No Drawings

FLEXIBLE, COMBUSTION-MODIFIED, POLYURETHANE FOAMS

BACKGROUND OF THE INVENTION

Flexible, combustion-modified polyurethane foams are known. See, e.g., U.S. Pat. Nos. 4,381,351 and 4,546,117. It is also known to produce such foams by reacting isocyanates with polyether polyols in the presence of melamine and, optionally, in the presence of various phosphorous flame retardants. See, U.S. Pat. Nos. 4,644,015, 4,745,133, 4,757,093, 4,757,094, 4,803,229, and 4,826,884, and British Patents 2,163,762 and 2,177,405.

U.S. Pat. No. 4,258,141 describes the production of flexible, combustion-modified polyurethane foams by reacting polyether polyols with a polymethylenepoly(-phenyl isocyanate) containing from 40 to 90% by weight of methylene-bis(phenyl isocyanate), in the presence of melamine.

U.S. Pat. Nos. 4,822,517 and 4,900,760 describe the production of flexible polyurethane foams using a specific polyisocyanate mixture which comprises: (a) from 73 to 77 percent by weight of methylene-bis(phenyl isocyanate), having an isomer distribution of from 30 to 34% by weight of the 2,4'isomer, from 60 to 66% by weight of the 4,4'-isomer and from 3 to 7% by weight of the 2,2'-isomer, and (b) from 23 to 27% by weight of higher functional methylene-bridged polyphenyl polyisocyanates. The foams described in these references did not contain flame retardants.

While many of the flexible combustion-modified polyurethane foams known in the art have met with some commercial success, such foams are generally deficient in one or more properties and are thus not useful for many applications. It was an object of the present invention to produce a foam having (i) excellent flame properties as measured by the Oxygen Index Test (ASTM D2863) and the Radiant Panel Test (ASTM 162), (ii) good tear strength as measured by ASTM Tests D3574 and D1938, (iii) good compression set and particularly good 50% set, and (iv) good softness properties.

DESCRIPTION OF THE INVENTION

The present invention is directed to a flexible, combustion modified polyurethane foam prepared by reacting:
a) one or more polyoxyalkylene polyols having hydroxy functionalities of from 2 to 3 and OH numbers of from about 10 to about 170, with
b) a polymethylene poly(phenyl isocyanate) having a methylene-bis-(phenyl isocyanate) content of from 70 to 77% by weight, wherein said methylene-bis-(phenyl isocyanate) consists of no more than 6% by weight of the 2,2'-isomer and up to 100% by weight of a mixture of the 4,4'-isomer and the 2,4'-isomer, with the weight ratio of the 4,4'-isomer to the 2,4'-isomer being from 2.3:1 to 7.0:1, in the presence of
c) melamine, in an amount such that the total amount of melamine in said foam is from about 17 to about 33% by weight,
d) a phosphorous flame retardant in amount such that the elemental phosphorous content in said foam is from about 0.15 to about 1.0% by weight, and
e) water as the sole blowing agent, the ratio of component a) to component b) being such that the isocyanate index is from about 80 to about 105.

It has been found that by preparing a foam according to the above formulation, all the various objects noted above were achieved.

According to the present invention, the monomer (or diisocyanate) content must be restricted to a narrow range, i.e., between about 70 and 77% of the total isocyanate. Too little monomer resulted in foams which split upon demolding and/or shrink severely. In addition, with too low a monomer content, tear strength was, at best, extremely poor (87 N/m is considered the minimum acceptable and with less than 70% monomer, this is difficult to achieve). Too high monomer content usually led to collapse of the foam before it was completely cured.

In addition, even within the critical range of total monomer content, it was also necessary to optimize the distribution of the isomers. It is known that a significant amount of 2,4'-methylene-bis(phenyl isocyanate) is usually required to obtain low enough IFD's. Indentation Force Deflection ("IFD"), also referred to as Indentation Load Deflection ("ILD"), is a measure of the resistance of a foam to a force being "indented" into the foam. The force measured after indenting a circular "indentor foot" to 25% of the foam thickness and holding for one minute is called the 25% R (25% rest) IFD. The 65% R IFD is identical except that the indentation is to 65% of the foam thickness. Typical molded flexible foams must achieve 25% R IFD's in the range of 67 to 223 N/323 cm$^2$. The ratio of 65% R to 25% R IFD is called the SAG Factor. This factor is a measure of how comfortable a foam will be in a seating application. It is desirable for the SAG Factor to be as high as possible. In typical "high resilience" molded polyurethane foams, the factor tends to be near 3.0. However, too high a 2,4'-isomer content can cause overstabilization (overstabilization refers to a situation where the foam is essentially closed-celled, and the cell walls are so thick as to render crushing very difficult) and excessive closed cell content. Too low a 2,4'-isomer content usually resulted in collapse of the foam.

A further complication is added by the requirement, in certain applications, for reduced flammability. This normally necessitates the addition of large amounts of solid fillers (hydrated alumina, melamine and expandable graphite are the most common). These fillers usually cause a large increase in foam hardness (as measured by IFD) as well as a loss in tensile properties.

It has been found, however, that within the range of compositions defined in the present invention that although total monomer content must be maintained at 70 to 77%, the dependence of physical properties on isomer content is reduced or eliminated in the case of tensile strength and tear strength. Compression sets are still affected by isomer content, but they improve as the ratio of 4,4'- to 2,4'-methylene-bis-(phenyl isocyanate) increases. The ease of manufacture of methylene-bis(-phenyl isocyanates) also increases with higher 4,4' to 2,4' ratios. In addition, added melamine actually exerted an unexpected softening effect (reduced 25% IFD), while still giving higher 65% IFD's. This result also led to extremely high SAG factors.

The most surprising result of the present invention was that, in the range of compositions specified in this invention, increasing levels of melamine actually caused a decrease in the foam hardness (25% IFD). For TDI-based foams, this phenomenon does not occur, nor does it appear to occur outside the range of phosphorous content described herein. This phenomenon also led to a dramatic increase in the SAG factor, the ratio of 65% to 25% IFD's. This markedly improves the "comfort" of the foam as seating material. That a foam should become softer on increased filler content is entirely unexpected.

This softening effect of melamine has an important advantage in that it also allows greater latitude in the isocyanate composition. One of the disadvantages of the use of methylene-bis(phenyl isocyanates) in flexible foam has been hardness (excessively high IFD's). One method of lowering the IFD of an MDI-based foam involves increasing the content of the 2,4'-isomer. This made manufacture of these isocyanates difficult, because the 4,4'-isomer is usually favored in the production of methylene-bis(phenyl isocyanate). In the present invention, this problem is apparently circumvented by the effect of added melamine and flame retardant.

The foams of the present invention require the use of a polymethylene poly(phenyl isocyanate) containing from about 70 to about 77% by weight of methylene bis(phenyl isocyanate), wherein said methylene bis(phenyl isocyanate) consists of no more than 6% by weight of the 2,2'-isomer and up to 100% by weight of a mixture of the 4,4'- and 2,4'-isomers, with the weight ratio of the 4,4'- to 2,4'-isomer being from 2.3:1 to 7.0:1, and preferably from about 2.4:1 to about 3.8:1. The isocyanates useful herein are generally known and are produced by reacting phosgene with aniline/formaldehyde condensates. Known processes for preparing the aniline/formaldehyde condensates and the resultant polyisocyanates are described in the literature and in many patents, for example, U.S. 2,683,730, 2,950,263, 3,012,008, 3,344,162, 3,362,979, and 4,256,849. Typically, such isocyanates have isocyanate group contents of from about 30 to about 35% by weight.

The foams of the present invention also require one or more polyether polyhydroxyl compounds having hydroxyl functionalities of from 2 to 3, and having molecular weights of from about 1000 to about 10,000, and preferably from about 2200 to about 6700 (corresponding to OH numbers of from about 11 to about 170 and from about 25 to about 50, respectively). Such polyethers are generally known in the art. These polyethers may be obtained by polymerizing epoxides, such as ethylene oxide, propylene oxide, butylene oxide, tetrahydrofuran, styrene oxide or epichlorohydrin in the presence of Lewis catalysts such as $BF_3$. Polymerization may also be accomplished by the addition of epoxides (preferably ethylene and/or propylene oxide) either in admixture or successively, to initiator compounds containing reactive hydrogen atoms such as water or alcohols. Examples of suitable initiator compounds include ethylene glycol, 1,3- and 1,2-propylene glycol, trimethylol propane (it is noted that in the present invention, if trimethylolpropane is used, the phosphorous must be present in the form of a phosphonate), glycerol and the like. It is generally preferred to utilize known polyoxyalkylene triols. As is recognized in the art such polyethers are generally prepared by addition of an epoxide, such as ethylene oxide or propylene oxide to an initiator such as trimethylolpropane, glycerin or the like. It is generally preferred to utilize polyoxyalkylene triols which contain predominant amounts of primary OH groups (generally up to 90% by weight, based on all the OH groups present in the polyether). A particularly preferred family of polyoxyalkylene triols are those produced utilizing glycerin as the initiator, an internal propylene oxide block and having ethylene oxide tipping.

According to the invention, water is used as the blowing agent. It is generally used in an amount of from 3.0 to 4.0% by weight based upon the amount of the polyether polyol.

The phosphorous containing flame retardants useful herein are also known. They include halogenated diphosphonate esters such as described in U.S. Pat. No. 3,192,242 and halogenated phosphate esters of the type described in U.S. Pat. No. 3,132,169. Specific examples of useful phosphorous containing flame retardants include: tetrakis-(2-chloroethyl)-ethylene diphosphate; tetrakis-(2-chloroethyl)-2,2-bis-(chloromethyl)-propylene diphosphate; tetrakis-(2-chloroethyl)-diethylether diphosphate; tris-(2,3-dibromopropyl)-phosphate; tri-($\beta,\beta'$-dichloroisopropyl)phosphate; tricresyl phosphate; diphenyl cresyl phosphate; triisopropyl phosphate; and the like. Specific commercially useful phosphorous containing flame retardants include Antiblaze 19 (available from Albright & Wilson), DG-8307 (available from Dover Chemical Company), Fyrol 38 and Fyrol 25 (both available from Akzo Chemical Company), isflamoll TKP and DPK (both available from Bayer AG), Firemaster 642 (available from Great Lakes Chemical), Pliabrac 519 (available from Albright & Wilson), and Thermolin 101 (available from Olin Corporation). Antiblaze 19 is the presently preferred phosphorous containing flame retardant.

Various filler materials may also be used provided that the total amount is no more than 0.5% by weight of the total foam. Suitable fillers include any of a large number of organic and inorganic materials used as extenders in polyurethane foams. Examples include barium sulfate, calcium carbonate, mica, vermiculite, chopped glass, silica, carbon black and the like.

Catalysts are also frequently used according to the invention. The catalysts added are generally known and include tertiary amines such as triethylamine, tributylamine, N-methylmorpholine, N-ethylmorpholine, N-cocomorpholine, N,N,N',N'-tetramethyl-ethylenediamine, 1,4-diazabicyclo-(2,2,2)-octane, N-methyl-N'-dimethylaminoethylpiperazine, N,N-dimethyl-benzylamine, bis-(N,N-diethylaminoethyl)adipate, N,N-diethylbenzylamine, pentamethyl diethylenetriamine, N,N-dimethylcyclohexylamine, N,N,N',N'-tetramethyl-1,3-butanediamine, N,N-dimethyl-$\beta$-phenylethylamine, 1,2-dimethylimidazole, 2-methylimidazole and the like. Also useful are the commercially available tertiary amines such as Niax Al and Niax AlO7, available from Union Carbide; Thancat DD, available from Texaco; and the like. Mannich bases known per se obtained from secondary amines such as dimethylamine and aldehydes, preferably formaldehyde, or ketones such as acetone, methyl ethyl ketone or cyclohexanone and phenols such as phenol nonylphenol or bisphenol may also be used as catalysts. Examples of catalysts which consist of tertiary amines having hydrogen atoms which are reactive with isocyanate groups include triethanolamine, triisopropanolamine, N-methyldiethanolamine, N-ethyldiethanolamine, N,N-dimethylethanolamine and their reaction products with alkylene oxides such as propylene oxide and/or ethylene oxide.

Silaamines having carbon-silicon bonds as described, e.g., in German Patent No. 1,229,290 and U.S. Pat. No. 3,620,984 may also be used as catalysts. Examples include 2,2,4-trimethyl-2-silamorpholine and 1,3-diethylaminoethyl-tetramethyldisiloxane.

Basic nitrogen compounds such as tetraalkylammonium hydroxides, alkali metal hydroxides such as sodium phenolate and alkali metal alcoholates such as sodium methylate may also be used as catalysts. Hexahydrotriazines are also suitable catalysts.

Organic metal compounds may also be used as catalysts according to the invention, in particular organic tin compounds. The organic tin compounds used are preferably tin(II) salts of carboxylic acids such as tin(II) acetate, tin(II) octoate, tin(II) ethyl hexoate and tin(II) laurate and tin(IV) compounds such as dibutyl tin oxide, dibutyl tin dichloride, dibutyl tin diacetate, dibutyl tin dilaurate, dibutyl tin maleate or dioctyl tin diacetate. All the above-mentioned catalysts may, of course, be used as mixtures.

Further examples of catalysts which may be used according to the invention and details concerning the activity of the catalysts are known and are described, e.g. in Kunststoff-Handbuch, Volume VII, published by Vieweg and Hochtlen, Carl-Hanser-Verlag, Munich 1966, pages 96 to 102.

The catalysts, when used, are generally used in a quantity of between about 0.001 and 10%, by weight, based on the quantity of polyether polyol.

Surface active additives such as emulsifiers and foam stabilizers may also be used according to the invention. Suitable emulsifiers include, e.g., the sodium salts of ricinoleic sulphonates or salts of fatty acids with amines such as oleic acid diethylamine or stearic acid diethanolamine. Alkali metal or ammonium salts of sulphonic acids such as dodecylbenzene sulphonic acid or dinaphthylmethane disulphonic acid or of fatty acids such as ricinoleic acid or of polymeric fatty acids may also be used as surface active additives.

Polyether siloxanes are particularly suitable foam stabilizers, especially useful are those which are water soluble. These compounds generally have a polydimethyl siloxane group attached to a copolymer of ethylene oxide and propylene oxide. Foam stabilizers of this kind are known and have been described, for example, in U.S. Pat. Nos. 2,834,748, 2,917,480 and 3,629,308. It may, however, be advantageous to carry out the process according to the invention without foam stabilizers.

Other additives which may also be used according to the invention include reaction retarders, e.g., substances which are acid in reaction such as hydrochloric acid or organic acid halides, cell regulators such as paraffins or fatty alcohols or dimethyl polysiloxanes, pigments, dyes, stabilizers against ageing and weathering, plasticizers, fungistatic and bacteriostatic substances.

Other examples of surface active additives, foam stabilizers, cell regulators, reaction retarders, stabilizers, plasticizers, dyes, and fungistatic and bacteriostatic substances which may be used according to the invention and details concerning the use and mode of these additives are known and may be found, e.g., in Kunststoff-Handbuch, Volume VII, published by Vieweg and Hochtlen, Carl-Hanser-Verlag, Munich 1966, on pages 103 to 113.

According to the invention, the components may be reacted together by known processes often using mechanical devices such as those described in U.S. Pat. No. 2,764,565. Details concerning processing apparatus which may be used according to the invention may be found in Kunststoff-Handbuch, Volume VII, published by Vieweg and Hochtlen, Carl-Hanser-Verlag, Munich, 1966, pages 121 and 205.

According to the invention, the foaming reaction for producing foam products is often carried out inside molds. In this process, the foamable reaction mixture is introduced into a mold which may be made of a metal such as aluminum or a plastics material such as an epoxide resin. The reaction mixture foams up inside the mold to produce the shaped product. The process of foaming in molds is carried out to produce a product having a cellular structure on its surface. According to the invention, the desired result can be obtained by introducing just sufficient foamable reaction mixture to fill the mold with foam after the reaction is completed.

So-called external mold release agents known in the art, such as silicone waxes and oils, are frequently used when foaming is carried out inside the molds. The process may also be carried out with the aid of so-called internal mold release agents, if desired, in combination with external mold release agents, e.g. described in German Offenlegungsschriften Nos. 2,121,670 and 2,307,589.

Cold setting foams may also be produced, as described in British Patent No. 1,162,517 and German Offenlegungsschrift No. 2,153,086.

Foams may, of course, also be produced by the process of block foaming or by the laminator process known in the art. The products obtainable according to the invention may be used, for example, as upholstery or padding materials.

The invention is further illustrated but is not intended to be limited by the following examples in which all parts and percentages are by weight unless otherwise specified.

EXAMPLES

The following materials were used:
POLYOL A: a glycerin/propylene oxide/ethylene oxide adduct (weight ratio of PO to EO was about 83:17), having an OH number of 28, and containing 82% primary OH groups;
POLYOL B: a sorbitol/propylene oxide/ethylene oxide reaction product having an OH number of about 70 (weight ratio of propylene oxide to ethylene oxide of about 1:7);
A-1: Niax A-1, a commercially available tertiary amine catalyst from Union Carbide, consisting of bis(2-dimethylaminoethyl)ether;
33LV: Dabco 33LV, a 33% by weight solution of triethylenediamine in dipropylene glycol, available from Air Products;
A-4: Niax A-4, a commercially available tertiary amine catalyst from Union Carbide;
L5309: Union Carbide Silicone Surfactant L5309, a commercially available poly(oxyalkylene)(dimethylsiloxane) copolymer;
AB-19: Antiblaze 19, a phosphorous containing flame retardant available from Albright & Wilson;
DG-8426: a liquid bromine containing flame retardant, available from Dover Chemical Company.

A polyol blend was prepared by mixing 100 parts by weight of POLYOL A, 0.28 parts by weight of A-1, 0.20 parts by weight of 33LV, 0.50 parts by weight of A-4, 3.5 parts by weight of water, 0.5 parts by weight of L5309, and 1.0 part by weight of POLYOL B.

Isocyanates were then prepared by blending various crude polymethylene poly(phenyl isocyanates) to obtain the compositions outlined in the following table (all contained about 32.8% by weight of isocyanate groups).

| Isocyanate | Isocyanate Compositions | | | | | | | | | |
|---|---|---|---|---|---|---|---|---|---|---|
| | A | B | C | D | E | F | G | H | I | J |
| Amt. Monomer (percent) | 75 | 75 | 65 | 80 | 75 | 75 | 75 | 75 | 75 | 75 |
| % 4,4' | 48 | 53 | 46 | 58 | 51 | 58 | 61 | 63 | 66 | 54 |
| % 2,4' | 24 | 19 | 17 | 19 | 21 | 15 | 13 | 11 | 8 | 18 |
| % 2,2' | 4 | 3 | 2 | 3 | 3 | 2 | 2 | 1 | 1 | 2 |
| 4,4'/2,4' | 2.0 | 2.8 | 2.7 | 3.1 | 2.4 | 3.9 | 4.7 | 5.7 | 8.3 | 3.0 |

In the tables which follows, the following terms are used:

% Phosphorous: Percent, by weight, of the element phosphorous contained in the polyurethane foam.

% Melamine: Percent, by weight, of melamine contained in the polyurethane foam.

Index: Percent of isocyanate reactive groups present in the specific amount of polyol blend required to consume all isocyanate groups present in the isocyanate used. This was calculated based on 32.8%, by weight, of NCO groups present in the isocyanates.

Density: Given in kilograms per cubic meter.

25% R IFD: 25% Rest Indentation Force Deflection as measured by ASTM-D-3574 in Newtons per 323 cm$^2$.

65% R IFD: 65% Rest Indentation Force Deflection as measured by ASTM-D-3574 in Newtons per 323 cm$^2$.

SAG: Support factor, the ratio of 65% R IFD to 25% R IFD.

Hysteresis: A measurement of resiliency in a flexible foam expressed as a percentage. High resilient foams have low values (usually under 20%). Hysteresis is also measured by ASTM-D-3574.

Tensile: Tensile strength in kilo pascals (kPa) as measured by ASTM-D-3574.

Elongation: Percent increase in length of a test specimen at tensile strength measured by ASTM D-3574.

Tear: Split tear strength in Newtons per meter measured by ASTM D-3574 and D-1938.

Compression Set: Measured at 50% compression at 23° C. and 50% relative humidity according to ASTM D-3574. Expressed in percent.

LOI: Limiting oxygen index, expressed as a percent, and measured according to ASTM D-2863.

General Procedure for Foam Production

The desired amount of polyol blend was measured into a cylindrical paper container. The container was 19.1 cm high and had a diameter of 8.75 cm. The various additives noted were weighed and added to the container and the entire mixture was thoroughly mixed using an air driven mixer equipped with a propeller-shaped stirrer.

The isocyanate was then measured into the container and the contents were thoroughly mixed using the same mixer. The final mixing typically was done in from 5 to 8 seconds. The resultant reaction mixture was then poured into a 22.5 cm × 22.5 cm × 10 cm aluminum mold which had been heated to about 49° C. The mold was covered with an aluminum lid and clamped shut for 4 to 7 minutes. The foam was removed from the mold and examined for signs of instability (collapse, hollow spots, and/or coarse cells) or overstability (tightness or splitting). The foam was then hand crushed and allowed to age for 24 hours at room temperature. The foam was then tested. Comparative examples are marked with an asterisk.

EXAMPLES 1 THROUGH 7

Examples 1 through 7 show the effect of variations in the relative amounts of 4,4' and 2,4'-isomers. To summarize, a low ratio (Example 2) results in a foam which is overstabilized, i.e., a high closed cell content, which causes excessive pressure within the foam. The result is that the foam tends to split. Even when it does not split, it is difficult to crush. Lower ratios of 4,4' to 2,4' also tend to give unacceptably high compression sets.

Higher weight ratios gave acceptable foams. They required, at most, only mild crushing because the closed cell content tended to be low. At very high weight ratios (much above 7/1 as in Example 7) the foam becomes so "open" that it becomes unstable and collapses before gelling.

Table 1 sets forth the compositions used and the results obtained.

TABLE 1

| Example | 1 | 2* | 3 | 4 | 5 | 6 | 7* |
|---|---|---|---|---|---|---|---|
| Iso | E | A | B | F | G | H | I |
| 4,4'/2,4' ratio | 2.4 | 2.0 | 2.8 | 3.9 | 4.7 | 5.7 | 8.3 |
| Wt. Polyol | 204 | 204 | 204 | 204 | 204 | 204 | 204 |
| Wt. Iso | 96 | 96 | 96 | 96 | 96 | 96 | 96 |
| Index | 89 | 89 | 89 | 89 | 89 | 89 | 89 |
| Wt. Melamine | 125 | 125 | 125 | 125 | 125 | 125 | 125 |
| AB19 | 6.7 | 6.7 | 6.7 | 6.7 | 6.7 | 6.7 | 6.7 |
| % Phosphorus | 0.33 | 0.33 | 0.33 | 0.33 | 0.33 | 0.33 | 0.33 |
| % Melamine | 29 | 29 | 29 | 29 | 29 | 29 | 29 |
| RESULTS: | | | | | | | |
| Foam Quality | Good | Split | Good | Good | Good | Good | Collapse |
| Density | 69 | 69 | 69 | 69 | 69 | 69 | — |
| 25% R IFD | 138 | 107 | 134 | 158 | 174 | 192 | — |
| 65% R IFD | 485 | 391 | 465 | 542 | 594 | 632 | — |
| SAG | 3.5 | 3.7 | 3.5 | 3.4 | 3.4 | 3.3 | — |
| Hysteresis | 21 | 21 | 20 | 23 | 24 | 26 | — |
| Tensile | 90 | 88 | 96 | 96 | 101 | 104 | — |
| Elongation | 93 | 101 | 92 | 86 | 85 | 83 | — |
| Tear | 137 | 133 | 147 | 133 | 154 | 124 | — |
| 50% Compression Set | 21.3 | 20.0 | 11.8 | 12.8 | 12.6 | 11.1 | — |
| LOI | 29.1 | 29.6 | 29.6 | 27.2 | 29.6 | 30.2 | — |

EXAMPLES 8 THROUGH 10

Examples 8 through 10 show that varying the total monomer o level gave similar effects to variations in 4,4' to 2,4' ratio. That is, a low percentage (<70%) of monomer gives over-stabilized foams which have a tendency to split apart on demold (example 8). They also have very low split tear strengths.

High percentages of monomer (>78%) give foams which collapse (example 10). Table 2 sets forth the compositions tested and the results obtained.

TABLE 2

| Example | 8* | 9 | 10* |
|---|---|---|---|
| Iso | C | B | D |
| Total diiso, % | 65 | 75 | 80 |
| Wt. Polyol | 190 | 190 | 190 |
| Wt. Iso | 93 | 93 | 93 |
| Index | 92 | 92 | 92 |
| Wt. Melamine | 72 | 72 | 72 |
| AB19 | 7.5 | 7.5 | 7.5 |
| DG8426 | 7.5 | 7.5 | 7.5 |
| % Phosphorus | 0.44 | 0.44 | 0.44 |
| % Melamine | 19.5 | 19.5 | 19.5 |
| RESULTS: | | | |
| Foam Quality | Split | Good | Collapse |
| Density | 59 | 59 | — |
| 25% R IFD | 81 | 106 | — |
| 65% R IFD | 277 | 327 | — |
| SAG | 3.4 | 3.1 | — |
| Hysteresis | 16 | 18 | — |
| Tensile | 66 | 85 | — |
| Elongation | 79 | 94 | — |
| Tear | 75 | 131 | — |
| 50% Compression Set | 6.0 | 7.7 | — |
| LOI | 29.1 | 27.5 | — |

EXAMPLES 11 THROUGH 26

Examples 11 through 26 demonstrate the effects of melamine and phosphorous levels. First, on progressing from none to about 20% melamine (examples 11, 13 and 14), the 25% R IFD decreased from 172 to 124 N/323 cm$^2$. Over the same range, the SAG factor increased from 2.5 to 3.1.

At higher levels of melamine, the 25% R IFD remained almost constant, but the 65% R IFD and SAG factor increased until the foams became unstable at excessive melamine levels (Examples 15-17).

It is also desirable to achieve an LOI of about 27. This was attainable with 19.6% melamine (example 14) and not with 14% melamine (example 13).

Examples 11, 12 and 18 through 26 show the effect of phosphorus. Examples 11 and 12 demonstrate that addition of phosphorus had a minimal effect on LOI and only a very slight effect on IFD. It also reduced the SAG factor without melamine. With melamine present, added phosphorus initially reduced SAG factor, but, beginning at 0.17% phosphorus (Example 20) and continuing until the foams become very coarse and largely unusable at over 1.0% phosphorus. The foams became softer and also showed increased SAG factors over when phosphorus is not present.

Increasing melamine content had a detrimental effect on compression set, which can be seen in experiments 12 and 16. An improvement in compression set is seen when phosphorus is added (Examples 18-26). In Examples 18-20 and 17 (increasing phosphorus) compression sets were high (around 20%). A further increase in phosphorus brought 50% compression sets into a more acceptable range. This is seen in Examples 21-26. At over 1.0% phosphorus, however, tear strength became unacceptable (a level of 87 N/m is the minimum acceptable level). In addition, the foam quality became unacceptable.

Table 3 sets forth the compositions used and the results obtained for Examples 11 through 17, while Table 4 sets forth the composition used for Examples 18 through 26 and Table 5 sets forth the results. In every instance, the isocyanate used was isocyanate E.

TABLE 3

| Example | 11* | 12* | 13 | 14 | 15 | 16 | 17* |
|---|---|---|---|---|---|---|---|
| Wt. Polyol | 204 | 204 | 204 | 204 | 204 | 204 | 204 |
| Wt. Iso | 96 | 96 | 96 | 96 | 96 | 96 | 96 |
| Index | 89 | 89 | 89 | 89 | 89 | 89 | 89 |
| Wt. Melamine | 0 | 0 | 50 | 75 | 100 | 150 | 175 |
| AB19 | 0 | 6.7 | 6.7 | 6.7 | 6.7 | 6.7 | 6.7 |
| % Phosphorus | 0 | 0.47 | 0.41 | 0.38 | 0.35 | 0.31 | 0.30 |
| % Melamine | 0 | 0 | 14.0 | 19.6 | 26.0 | 32.8 | 36.3 |
| RESULTS: | | | | | | | |
| Foam Quality | Good | Good | Good | Good | Good | Good | Unstable |
| Density | 48 | 50 | 56 | 61 | 64 | 74 | — |
| 25% R IFD | 172 | 166 | 139 | 124 | 141 | 139 | — |
| 65% R IFD | 433 | 392 | 399 | 386 | 462 | 529 | — |
| SAG | 2.5 | 2.4 | 2.9 | 3.1 | 3.3 | 3.8 | — |
| Hysteresis | 23 | 20 | 19 | 18 | 21 | 22 | — |
| Tensile | 127 | 107 | 102 | 92 | 102 | 92 | — |
| Elongation | 123 | 109 | 106 | 99 | 105 | 88 | — |
| Tear | 222 | 186 | 151 | 128 | 154 | 126 | — |
| 50% Compression Set | 11.8 | 11.5 | 11.7 | 8.7 | 17.9 | 21.1 | — |
| LOI | 21.8 | 23.6 | 25.6 | 28.1 | 28.5 | 29.6 | — |

Example 17 was deemed "unstable" because the foam had hollow spots and because the surface was not uniform, i.e., it contained areas of very fine cells and areas of coarse (larger) cells.

TABLE 4

| Example | 18* | 19* | 20 | 21 | 22 | 23 | 24 | 25* | 26* |
|---|---|---|---|---|---|---|---|---|---|
| Wt. Polyol | 204 | 204 | 204 | 204 | 204 | 204 | 204 | 204 | 204 |
| Wt. Iso | 96 | 96 | 96 | 96 | 96 | 96 | 96 | 96 | 96 |
| Index | 89 | 89 | 89 | 89 | 89 | 89 | 89 | 89 | 89 |
| Wt. Melamine | 125 | 125 | 125 | 125 | 125 | 125 | 125 | 125 | 125 |

TABLE 4-continued

| Example | 18* | 19* | 20 | 21 | 22 | 23 | 24 | 25* | 26* |
|---|---|---|---|---|---|---|---|---|---|
| AB19 | 0 | 1.6 | 3.3 | 10 | 13 | 16 | 20 | 24 | 28 |
| % Phosphorus | 0 | 0.08 | 0.17 | 0.49 | 0.64 | 0.78 | 0.97 | 1.15 | 1.33 |
| % Melamine | 29.4 | 29.3 | 29.2 | 28.7 | 28.5 | 28.3 | 28.1 | 27.8 | 27.6 |

TABLE 5

| Example | 18* | 19* | 20 | 21 | 22 | 23 | 24 | 25* | 26* |
|---|---|---|---|---|---|---|---|---|---|
| Foam Quality | Good | Good | Good | Good | Good | Good | Good | Good | Fair |
| Density | 69 | 69 | 69 | 70 | 69 | 70 | 69 | 72 | 72 |
| 25% R IFD | 161 | 157 | 152 | 108 | 94 | 88 | 81 | 86 | 79 |
| 65% R IFD | 542 | 522 | 511 | 393 | 353 | 326 | 308 | 317 | 306 |
| SAG | 3.4 | 3.3 | 3.4 | 3.6 | 3.7 | 3.7 | 3.8 | 3.7 | 3.9 |
| Hysteresis | 25 | 25 | 23 | 19 | 19 | 18 | 19 | 18 | 20 |
| Tensile | 116 | 106 | 101 | 87 | 79 | 74 | 68 | 76 | 59 |
| Elongation | 103 | 100 | 90 | 97 | 92 | 90 | 89 | 89 | 78 |
| Tear | 159 | 151 | 142 | 98 | 105 | 107 | 96 | 65 | 102 |
| 50% Compression Set | 24.1 | 27.4 | 22.1 | 8.7 | 10.0 | 7.4 | 7.9 | 8.5 | 8.2 |
| LOI | 29.6 | 29.4 | 28.5 | 29.6 | 30.8 | 29.4 | 30.8 | 30.8 | 30.2 |

NOTE:
"Fair" in Example 26 is used to indicate that the foam looked uniform, but in comparison to the foams rated "good", had a noticeably coarser cell structure. It also felt clammy, presumably because the liquid flame retardant was "bleeding" from the foam.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A flexible, combustion modified polyurethane foam prepared by reacting:
    a) one or more polyoxyalkylene polyols having hydroxy functionalities of from 2 to 3 and OH numbers of from about 10 to about 170, with
    b) a polymethylene poly(phenyl isocyanate) having a methylene-bis(phenyl isocyanate) content of from 70 to 77% by weight, wherein said methylene-bis(phenyl isocyanate) consists of no more than 6% by weight of the 2,2'-isomer and up to 100% by weight of a mixture of the 4,4'-isomer and the 2,4'-isomer, with the weight ratio of the 4,4'-isomer to the 2,4'-isomer being from 2.3:1 to 7.0:1, in the presence of
    c) melamine, in an amount such that the total amount of melamine in said foam is from about 17 to about 33% by weight,
    d) a phosphorous flame retardant in amount such that the elemental phosphorous content in said foam is from about 0.15 to about 1.0% by weight, and
    e) water as the sole blowing agent, the ratio of component a) to component b) being such that the isocyanate index is from about 80 to about 105.

2. The foam of claim 1, wherein said weight ratio is from about 2.4:1 to about 3.8:1.

3. The foam of claim 1, wherein said polymethylene poly(phenyl isocyanate) has an isocyanate group content of from about 30 to about 35% by weight.

4. The foam of claim 1, wherein said polyol has an OH number of from about 25 to about 50.

* * * * *